United States Patent [19]

Ikenoya et al.

[11] 4,437,305

[45] Mar. 20, 1984

[54] EXHAUST GAS CLEANING SYSTEM FOR INTERNAL COMBUSTION ENGINES

[75] Inventors: Yasuo Ikenoya; Masafumi Araki, both of Kawagoe; Yozi Shimizu, Wako, all of Japan

[73] Assignee: Honda Giken Kogyo Kabushiki Kaisha, Tokyo, Japan

[21] Appl. No.: 421,330

[22] Filed: Sep. 22, 1982

[30] Foreign Application Priority Data

Dec. 17, 1981 [JP] Japan .................................. 56-204302

[51] Int. Cl.$^3$ .............................................. F01N 3/30
[52] U.S. Cl. ...................................................... 60/293
[58] Field of Search .......................................... 60/293

[56] References Cited

U.S. PATENT DOCUMENTS 4,154,058  5/1979  Mase ...................................... 60/313
4,160,364  7/1979  Mori ...................................... 60/293

FOREIGN PATENT DOCUMENTS 55-161911  12/1980  Japan ...................................... 60/293

Primary Examiner—Douglas Hart
Attorney, Agent, or Firm—Armstrong, Nikaido, Marmelstein & Kubovcik

[57] ABSTRACT

An improvement of an exhaust gas cleaning system for an internal combustion engine which is provided with a secondary air feed system connected to an exhaust port and a reed valve device opened on an exhaust pulsation pressure arising in the exhaust port to feed secondary air to the exhaust port.

The secondry air feed system has an upstream side secondary air passage through to the atmosphere and a downstream side secondary air passage formed on a thick wall zone of the internal combustion engine proper and connected through to the exhaust port. The reed valve device has a valve casing installed on the circumference of the engine proper, an inflow port connected to the upstream side secondary air passage, and an efflux port connected to the downstream side secondary air passage. The valve casing is partitioned internally into an upstream chamber provided adjacently to the engine proper and a downstream chamber provided on a side away from the engine proper across the upstream chamber. A reed valve body to allow a secondary air to flow from the upstream chamber to the downstream chamber is arranged between the chambers.

1 Claim, 4 Drawing Figures

EXHAUST GAS CLEANING SYSTEM FOR INTERNAL COMBUSTION ENGINES

BACKGROUND OF THE INVENTION

1. Field of the Invention

This invention relates to an exhaust gas cleaning system for internal combustion engines, which operates to feed a secondary air to an exhaust port of internal combustion engines, thereby oxidizing and eliminating unburned noxious components such as HC and CO mixed in an exhaust gas flowing therein.

2. Description of the Prior Art

Generally known in such type of exhaust gas cleaning system as comprises connecting a secondary air feed system through to an exhaust system of an internal combustion engine, providing a reed valve device midway of the secondary air feed system, introducing an exhaust gas cleaning secondary air into the exhaust system by opening the reed valve device through operation of the internal combustion engine, thereby eliminating unburned noxious components in the exhaust system. Then, the inventors have proposed an improved exhaust gas cleaning system, whereby a secondary air passage between a reed valve device and an exhaust port of an engine proper is shortened in distance by installing the reed valve device on the side of the internal combustion engine proper, thereby allowing the secondary air to flow into the exhaust port with less resistance, and a maintainability is improved for replacing the reed valve itself and an ignition plug of the engine proper and adjusting a tappet.

However, the secondary air passage between the exhaust port and the reed valve device which is excessively shortened may allow a hot exhaust gas to flow to the reed valve device, thus causing another disadvantage to accelerate a deterioration on such member as is weak in heat like a rubber packing in the device.

SUMMARY OF THE INVENTION

A principal object of this invention is to provide an exhaust gas cleaning system for internal combustion engines, for which the above disadvantage is dissolved particularly in this respect.

According to this invention, the above object will be attained by providing an exhaust gas cleaning system for internal combustion engines which is provided with a secondary air feed system connected to an exhaust port of an internal combustion engine and a reed valve device mounted midway of the secondary air feed system and opened on an exhaust pulsation pressure arising in the exhaust port at the time of internal combustion engine operation to feed an exhaust gas cleaning secondary air to the exhaust port, the secondary air feed system having an upstream side secondary air passage through to the atmosphere and a downstream side secondary air passage formed on a thick wall zone of the internal combustion engine proper and connected through to the exhaust port, and the reed valve device having a valve casing installed on the circumference of the engine proper, an inflow port connected to the upstream side secondary air passage, and an efflux port connected to the downstream side secondary air passage. The valve casing is partitioned internally into an upstream chamber provided adjacently to the engine proper and connected through to the inflow port and a downstream chamber provided on a side away from the engine proper across the upstream chamber and connected through to the efflux port, and a valve body to allow a secondary air to flow from the upstream chamber to the downstream chamber on an exhaust pulsation pressure in the exhaust port is arranged between both the upstream and downstream chambers.

The above and other objects, features and advantages of the invention will become apparent from the following detailed description of a preferred embodiment when taken in conjunction with the accompanying drawings.

DESCRIPTION OF THE PREFERRED EMBODIMENT

The invention will now be described for its one preferred embodiment when a system according to the invention is put into practice on SOHC type four-cycle internal combustion engine E mounted on a motor cycle with reference to the accompanying drawings.

Figure 1:
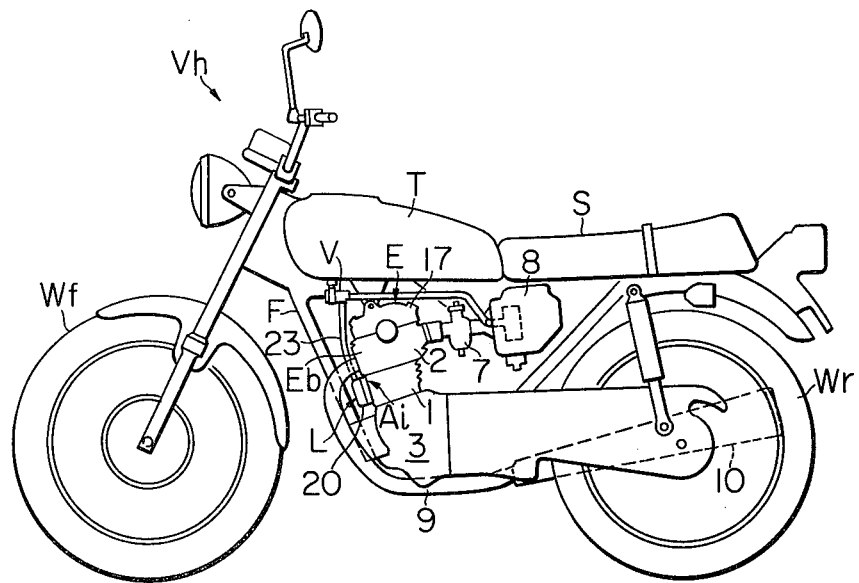
FIG. 1 is a side view of a motor cycle mounted with an internal combustion engine provided with a system according to the invention.

In FIG. 1, a fuel tank T and a seat S are borne on the top of a body frame F of a motor cycle Vh, front and rear wheels Wf, Wr are borne longitudinally thereof, and the internal combustion engine E for driving the rear wheel Wr is mounted on the body frame F in the space surrounded thereby.

Figure 2:
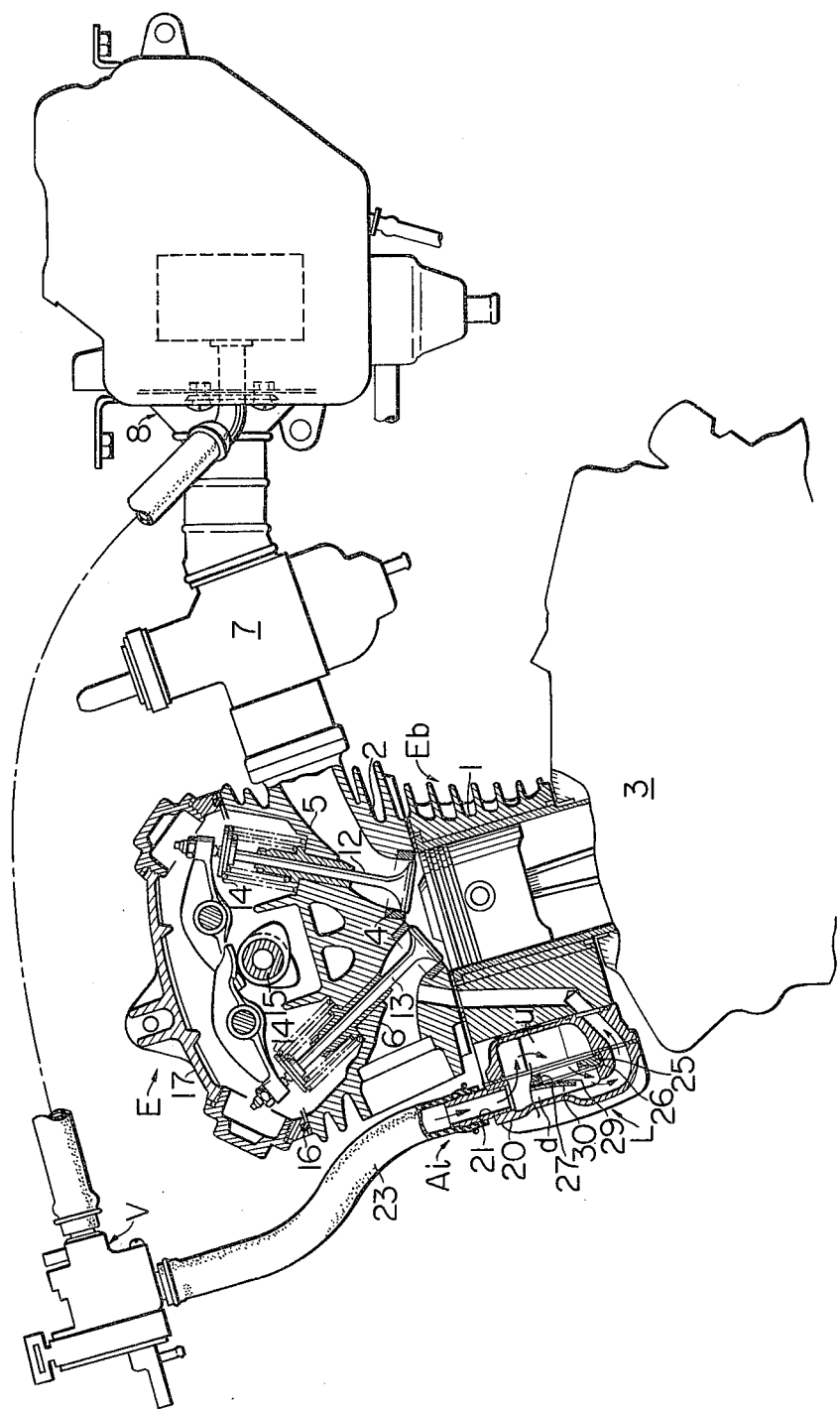
FIG. 2 is a side view, partly in longitudinal section, of the internal combustion engine.
Figure 3:
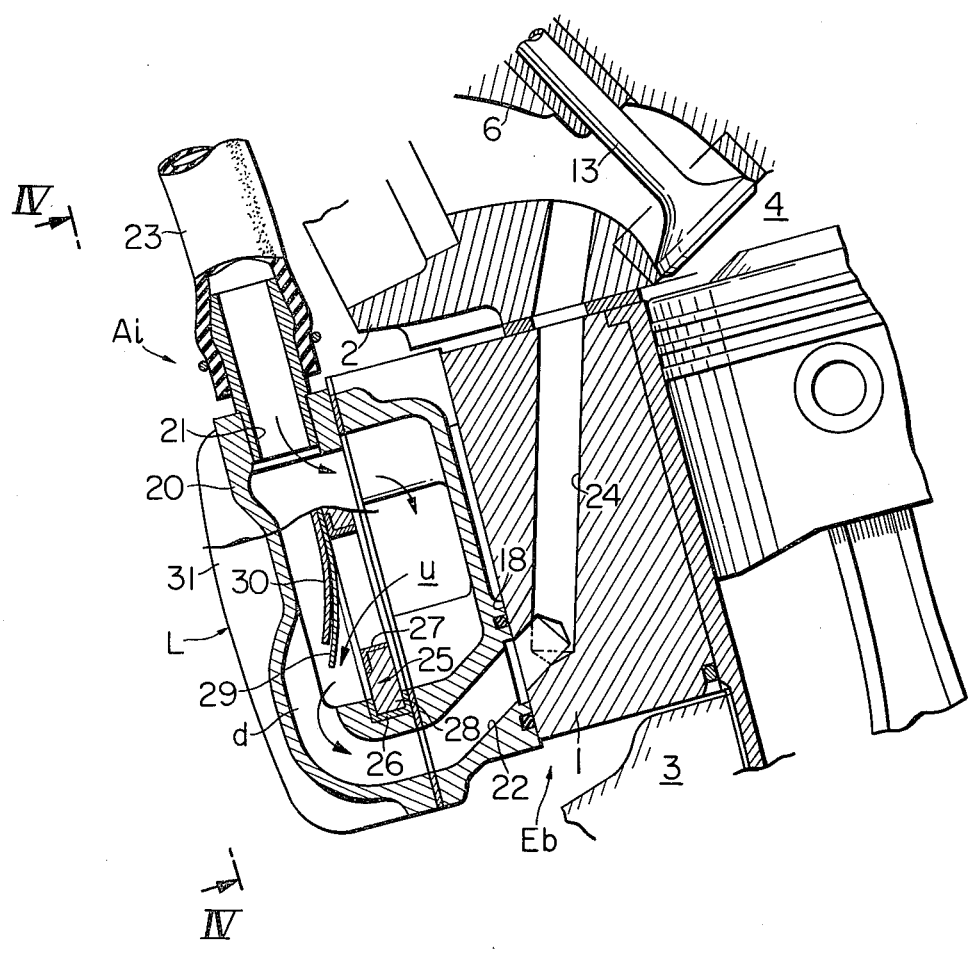
FIG. 3 is a partly enlarged view of FIG. 2 and is also a sectional view taken on line III—III of FIG. 4.
Figure 4:
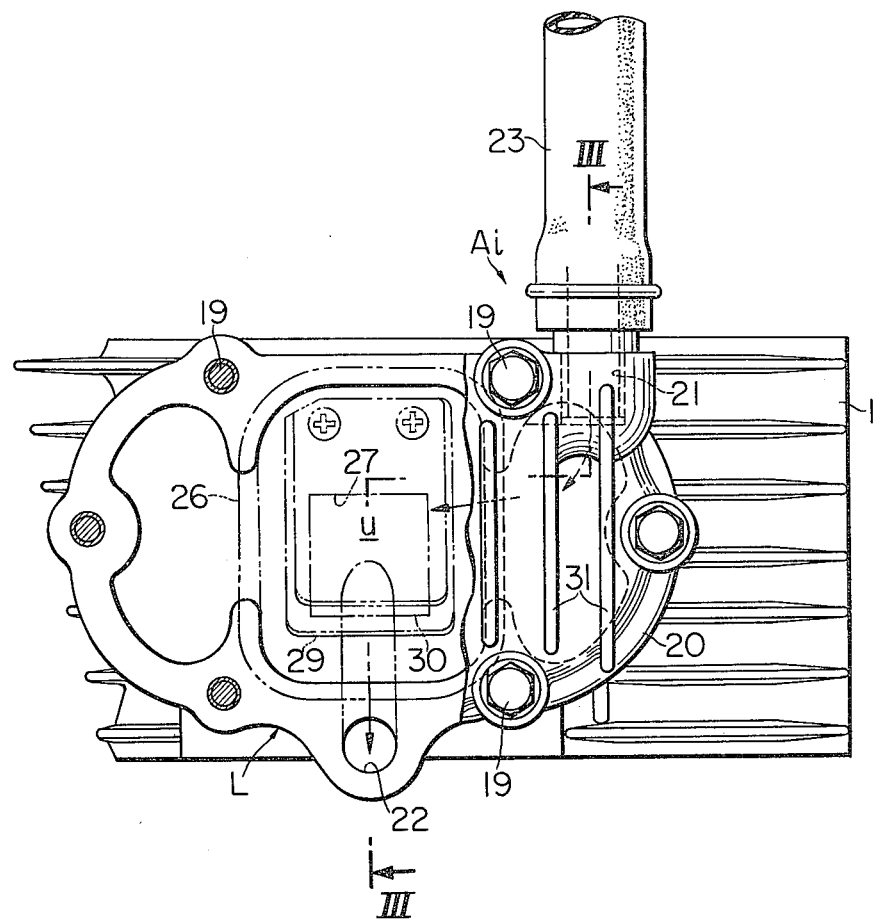
FIG. 4 is a partly broken view taken on line IV—IV of FIG. 3.

In FIG. 2 to FIG. 4, an engine proper Eb of the internal combustion engine E is constituted to combine a cylinder head 2 and a crank case 3 integrally on and under a cylinder block 1.

An intake port 5 through to a combustion chamber 4 is provided on the rear side (to the body frame F) of the cylinder head 2, and an exhaust port 6 through to the combustion chamber 4 is provided on the front side of the cylinder head 2.

The intake port 5 opens to the rear of the engine proper Eb, and the exhaust port 6 opens to the front of the engine proper Eb. As shown in FIG. 1, an intake system comprising a carburetor 7 and an air cleaner 8 is arranged in the rear of the engine proper Eb is connected to the intake port 5, an exhaust system comprising an exhaust pipe 9 and an exhaust muffler 10 is connected to the exhaust port 6, and an exhaust gas cleaning catalytic converter is mounted, as occasion demands, midway of the muffler 10. Then, intake and exhaust valves 12, 13 to operate opening ends on the combustion chamber 4 side of the intake and exhaust ports 5, 6 are provided on the cylinder head 2 in normal arrangement, and they are actuated through a cooperative behavior of a valve spring 14 and a rotating motion cam 15. An ignition plug (not illustrated) is screwed on the cylinder head 2 between the intake and exhaust valves 12, 13 with its electrodes kept fronting on the combustion chamber.

A cylinder head cover 17 is mounted on the top of cylinder head 2 through a packing 16.

A reed valve device L is provided on the front of the cylinder block 1, i.e. on the front side (the left side of FIG. 2, FIG. 3) of the motor cycle.

The reed valve device L which is constituted in unit beforehand is mounted on a mounting face 18 prepared on the front of the cylinder block 1 with a plurality of fitting bolts 19 . . . .

An inflow port 21 is provided on the circumference of a valve casing 20 of the reed valve device L, and an efflux port 22 is provided on a junction with the cylinder block 1.

An upstream side secondary air passage 23 through to the atmosphere by way of an air purifying chamber of the air cleaner 8 is connected through to the inflow port 21, and an air control valve V to operate the passage is interposed midway of the upstream side secondary air passage 23. Then, the lower end of a downstream side secondary air passage 24 formed covering the cylinder block 1 of the engine proper Eb and a thick wall zone of the cylinder head 2 is connected through to the efflux port 22, and the upper end of the downstream side secondary air passage 24 is connected through to the neighborhood of the exhaust valve 13 of the exhaust port 6. Both the upstream side and downstream side secondary air passages 23, 24 constitute a secondary air feed system Ai of the invention.

A reed valve body 25 is enclosed in the valve casing 20 of the reed valve device L, the reed valve body 25 partitions the valve casing 20 internally into an upstream chamber "u" coming near to the engine proper Eb and a downstream chamber "d" kept away from the engine proper Eb across the reed valve body 25, the upstream chamber "u" being connected through to the inflow port 21, and the downstream chamber "d" being connected through to the efflux port 22. Then, the downstream side secondary air passage 24 can be formed somewhat longer which is connected through to the efflux port 22 of the downstream chamber "d" by forming the downstream chamber "d" to the side kept away from the engine proper Eb across the reed valve body 25 as described.

The reed valve body 25 is retained in the valve casing 20 through a heat resisting packing 26, and is constituted to have a reed 29 to operate a valve port 27 and a reed stopper 30 to regulate the reed 29 for opening piled up and fixed on one face of a valve seat 28 in which the valve port 27 is perforated at the center. It is opened when an exhaust pulsation pressure is generated in the exhaust port 6 on operation of the internal combustion engine E, allowing a secondary air to flow from the upstream chamber "u" to the downstream chamber "d" only as indicated by arrows in FIG. 2 and FIG. 3.

In the drawing, 31 denotes a cooling fin formed on the circumference of the valve casing.

Next, the one preferred embodiment of this invention which is constituted as above will be described for operation.

When the internal combustion engine E is put in motion, an exhaust pulsation pressure is generated in the exhaust port 6, the pulsation pressure reaches the reed valve body 25 by way of the downstream side secondary air passage 24 to operate it intermittently, and a part of the purified air in the air cleaner 8 flows into the reed valve device L by way of the upstream side secondary air passage 23 with the air control valve V kept open by the operation of the internal combustion engine E. The secondary air coming into the reed valve device L flows into the downstream chamber "d" from the inflow port 21 by way of the upstream chamber "u" close to the engine proper Eb and the valve port 27 of the reed valve body 25 and further flows into the exhaust port 6 therefrom by way of the downstream side secondary air passage 24. The secondary air introduced into the exhaust port 6 is mixed in an exhaust gas to oxidize unburned noxious components such as HC and CO in the exhaust gas in the exhaust port 6 and the exhaust pipe 9. Further the exhaust gas with the secondary air mixed therein flows into the muffler 10, accelerates a catalytic converter incorporated therein for reaction to eliminate the unburned noxious components and is then discharged into the atmosphere.

Meantime, when the motor cycle Vh runs according to the operation of the internal combustion engine E, a part of the running air current strikes on the front of the reed valve device L to cool down the reed valve device L and then flows rearward.

As described above, according to this invention, since the reed valve device L of the exhaust gas cleaning system is installed on the circumference of the engine proper Eb of the internal combustion engine E, not only a maintainability of the reed valve device L itself is improved but also the reed valve device L will not prevent a maintenance of the engine proper Eb for ignition plug replacement and tappet adjustment.

Then, the inflow port 21 of the reed valve device L is connected to the upstream side secondary air passage 23 through to the atmosphere and the efflux port 22 of the device L is formed on a thick wall zone of the engine proper Eb and connected to the downstream side secondary air passage 24 through to the exhaust port 6, the valve casing 20 of the reed valve device L is partitioned internally into the upstream chamber "u" adjacent to the engine proper Eb and through to the inflow port 21 and the downstream chamber "d" through to the efflux port 22 on the side away from the engine proper Eb, and the reed valve body 25 allowing a secondary air to flow from the upstream chamber "u" to the downstream chamber "d" on an exhaust pulsation pressure in the exhaust port 6 is provided between the upstream and downstream chambers "u", "d", therefore a distance of the downstream side secondary air passage 24 ranging from the exhaust port 6 to the reed valve body 25 can be set comparatively long, an exhaust gas reaching the reed valve body 25 from the exhaust port 6 by way of the downstream side secondary air passage 24 can be cooled down while it passes the downstream side secondary air passage 24, the cooled secondary air from the upstream side secondary air passage 23 flows from the upstream chamber "u" between the engine proper Eb and the reed valve body 25 to the downstream chamber "d" and keeps meanwhile the heat from being transferred from the engine proper Eb to the reed valve body 25 to prevent overheating on the reed valve body 25 and particularly the packing material 26 weak in heat, thus securing a correct operation of the reed valve body 25 and prolonging the life thereof.

What is claimed is:

1. In an exhaust gas cleaning system for internal combustion engines which is provided with a secondary air feed system connected to an exhaust port of an internal combustion engine and a reed valve device mounted midway of the secondary air feed system and opened on an exhaust pulsation pressure arising in the exhaust port at the time of internal combustion engine operation to feed an exhaust gas cleaning secondary air to the exhaust port, the improvement characterized in that the secondary air feed system has an upstream side secondary air passage through to the atmosphere and a downstream side secondary air passage formed on a thick wall zone of the internal combustion engine proper and connected through to the exhaust port, the reed valve device has a valve casing installed on the circumference of the engine proper, an inflow port connected to the upstream side secondary air passage, and an efflux port connected to the downstream side secondary air passage, the valve casing is partitioned internally into an upstream chamber provided adjacently to the engine proper and connected through to the inflow port and a downstream chamber provided on a side away from the engine proper across the upstream chamber and connected through to the efflux port, a reed valve body to allow a secondary air to flow from the upstream chamber to the downstream chamber on an exhaust pulsation pressure in the exhaust port is arranged between both the upstream and downstream chambers.

* * * * *